United States Patent
Avins

(10) Patent No.: US 10,107,356 B2
(45) Date of Patent: Oct. 23, 2018

(54) TORQUE CONVERTER INCLUDING DAMPER ASSEMBLY WITH HYSTERESIS CONTROL PACKAGE

(71) Applicant: Schaeffler Technologies AG & Co. KG, Herzogenaurach (DE)

(72) Inventor: David Avins, Burbank, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 227 days.

(21) Appl. No.: 15/139,534

(22) Filed: Apr. 27, 2016

(65) Prior Publication Data

US 2017/0314638 A1    Nov. 2, 2017

(51) Int. Cl.
*F16F 15/12*    (2006.01)
*F16F 15/123*   (2006.01)
(Continued)

(52) U.S. Cl.
CPC ......... *F16F 15/1232* (2013.01); *F16H 41/28* (2013.01); *F16H 45/02* (2013.01); *F16H 2045/0221* (2013.01)

(58) Field of Classification Search
CPC ...... F16F 15/121; F16F 15/123; F16F 15/129; F16F 15/1232; F16H 45/02; F16H 2045/0221; F16D 33/18
See application file for complete search history.

(56) References Cited

U.S. PATENT DOCUMENTS 5,518,099 A * 5/1996 Murphy .................. F16D 13/64
                                                  192/207
8,328,646 B2   12/2012  Droll et al.
(Continued)

FOREIGN PATENT DOCUMENTS

JP      H07317842 A      12/1995
JP      2002181131 A      6/2002
WO    WO2004065819 A1    8/2004

OTHER PUBLICATIONS

Corresponding PCT International Search Report and Written Opinion PCT/US2017/029206.

Primary Examiner — Thomas E Lazo
(74) Attorney, Agent, or Firm — Davidson, Davidson & Kappel, LLC

(57) ABSTRACT

A torque converter is provided. The torque converter includes an axially movable turbine piston and a damper assembly fixed to the turbine piston. The damper assembly includes a first cover plate, a second cover plate, a plurality of fasteners fixing the first cover plate and the second cover plate together such that the second cover plate is spaced from the first cover plate, a first drive flange axially between the first and second cover plates, a second drive flange axially between the first and second cover plates and an elastic element axially between the first and second cover plates. The first cover plate, the second cover plate, the second flange, the fasteners and the elastic element are axially movable with the piston turbine independently of the drive flange. The elastic element is configured to create a controlled rotational hysteresis between the second drive flange and the first and second cover plates during the axial movement of the first cover plate, the second cover plate, the second flange, the fasteners and the elastic element. A method of forming a torque converter is also provided.

20 Claims, 4 Drawing Sheets

(51) Int. Cl.
*F16H 45/02* (2006.01)
*F16H 41/28* (2006.01)

(56) References Cited

U.S. PATENT DOCUMENTS

| | | | |
|---|---|---|---|
| 8,795,093 B2* | 8/2014 | Saeki | F16F 15/1295 |
| | | | 464/68.41 |
| 8,919,751 B2 | 12/2014 | Kneidel | |
| 2014/0097055 A1* | 4/2014 | Lindemann | F16H 41/24 |
| | | | 192/3.21 |
| 2015/0087430 A1 | 3/2015 | Norwich | |

* cited by examiner

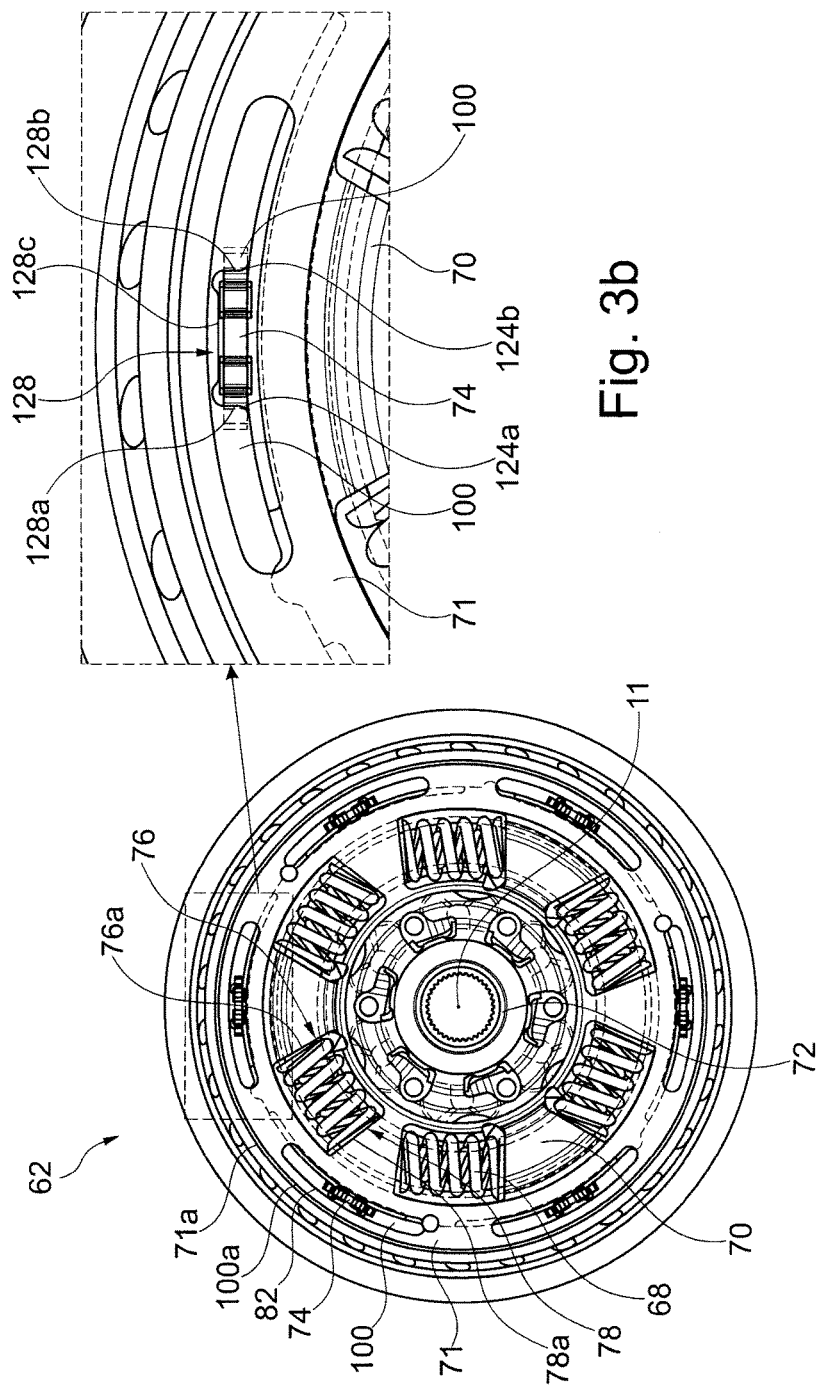

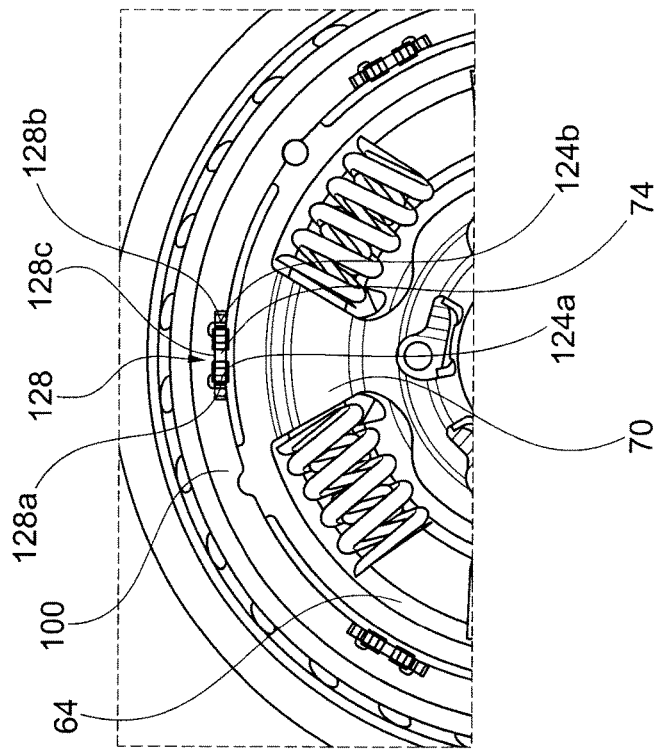
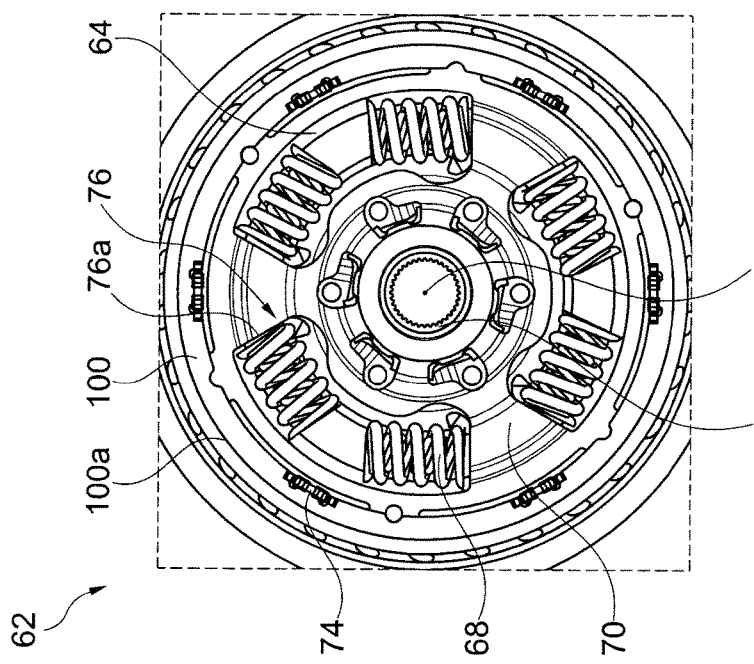
Fig. 3d
Fig. 3c

TORQUE CONVERTER INCLUDING DAMPER ASSEMBLY WITH HYSTERESIS CONTROL PACKAGE

The present disclosure relates generally to torque converters and more specifically to the damper assemblies in torque converters.

BACKGROUND

U.S. Pat. No. 8,919,751 discloses a damper assembly including a riveted diaphragm spring hysteresis package and U.S. Pat. No. 8,328,646 discloses a damper assembly including a spring element on the drive flange. U.S. Publication No. 2014/0097055 discloses a torque converter with an axially movable turbine used as a piston of a lockup clutch.

SUMMARY OF THE INVENTION

A torque converter is provided. The torque converter includes an axially movable turbine piston and a damper assembly fixed to the turbine piston. The damper assembly includes a first cover plate, a second cover plate, a plurality of fasteners fixing the first cover plate and the second cover plate together such that the second cover plate is spaced from the first cover plate, a first drive flange axially between the first and second cover plates, a second drive flange axially between the first and second cover plates and an elastic element axially between the first and second cover plates. The first cover plate, the second cover plate, the second flange, the fasteners and the elastic element are axially movable with the piston turbine independently of the drive flange. The elastic element is configured to create a controlled rotational hysteresis between the second drive flange and the first and second cover plates during the axial movement of the first cover plate, the second cover plate, the second flange, the fasteners and the elastic element.

A method of forming a torque converter is also provided. The method includes fixing a first cover plate to turbine piston; and providing a first drive flange, a second drive flange and an elastic element axially between the first cover plate and a second cover plate and fixing the first and second cover plates together to form a damper assembly such that the first cover plate, the second cover plate, the second flange, the fasteners and the elastic element are axially movable with the piston turbine independently of the drive flange and the elastic element is configured to create a controlled rotational hysteresis between the second drive flange and the first and second cover plates during the axial movement of the first cover plate, the second cover plate, the second flange, the fasteners and the elastic element.

BRIEF DESCRIPTION OF THE DRAWINGS

The present invention is described below by reference to the following drawings, in which:

FIG. 3a shows an axial plan view of the damper assembly with a cover plate removed and FIG. 3b shows an enlarged view of a portion of view in FIG. 3a; and FIG. 3c shows an axial plan view of the damper assembly with the cover plate and an outer flange removed and FIG. 3d shows an enlarged view of a portion of view in FIG. 3c.

DETAILED DESCRIPTION

The disclosure provides damper assembly including a thinly designed rotational hysteresis package between the outer flange and the cover plates that allows axial movement between the inner flange and the diaphragm spring/cover plate assembly for use in the limited axial clearance in iTC dampers (i.e., dampers used in torque converters where the turbine is also the lockup clutch piston) that are riveted directly to the turbine piston. Embodiments of the invention control rotational hysteresis (friction) between the outer flange and the cover plates of an in-line series damper assembly to improve NVH, and solve issues related to having a rotational hysteresis package between the outer flange and the cover plates, while allowing axial movement between the inner flange and the cover plate assembly, which includes the diaphragm spring, outer flange and sheet metal rivets. In one embodiment, the hysteresis diaphragm spring is located between the ledge of a stepped sheet metal rivet and the outer flange; the spring creating a controlled load against the outer flange thus pressing it against the left cover plate to control rotational hysteresis between the outer flange and the cover plate assembly. In another embodiment, the hysteresis package may be located between the inner flange and cover plates.

Figure 1:
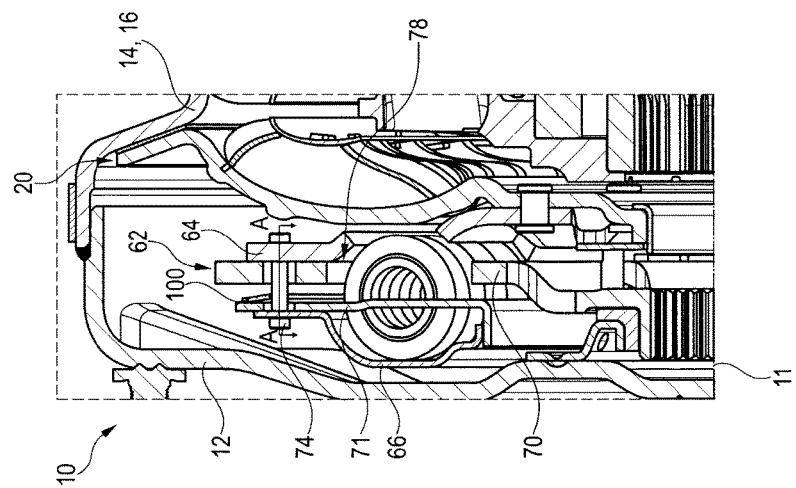
FIGS. 1a and 1b shows cross-sectional side views of a torque converter in accordance with an embodiment of the present invention, with the view in FIGS. 1a and 1b being circumferentially offset from each other.

FIGS. 1a and 1b shows cross-sectional side views of a torque converter 10 in accordance with an embodiment of the present invention, with the view in FIGS. 1a and 1b being circumferentially offset from each other. Torque converter 10 is rotatable about a center axis 11 and includes a front cover 12 for connecting to a crankshaft of an internal combustion engine and a rear cover 14 forming a shell 16 of an impeller or pump 18. The terms axially, radially and circumferentially as used herein are used with respect to center axis 11. Torque converter 10 also includes a turbine 20 configured to define a piston that is axially moveable toward and away from impeller 18 to engage and disengage an impeller clutch of impeller 18 so as to form a lockup clutch. Turbine piston 20 includes a turbine shell 22 and a core ring 24 supporting a plurality of turbine blades 26 therebetween.

Turbine shell 22 includes a rounded blade supporting portion 28, which is shaped as an annular bowl, for contacting engine side edges of turbine blades 26. Radially outside of blade supporting portion 28, an outer radial extension 30, which forms the piston, radially protrudes outwardly from an outer circumference of blade supporting portion 28 to define an annular protrusion having a flat annular radially extending impeller facing surface 30a and having an outermost circumference that defines an outermost circumference of turbine piston 20. Accordingly, the piston and turbine shell 22 are formed as a single piece. Radially inside of blade supporting portion 28, turbine shell 22 includes an annular inner radial extension 31 that, at an inner radial end thereof, joins an axially extending inner circumferential section 33, whose inner circumferential surface contacts an outer circumferential surface of a hub 35.

Impeller 18 includes impeller blades 34, which are each fixed at a transmission side thereof to impeller shell 16 and are each fixed to an impeller core ring 37 at an engine side thereof by tabs. Impeller shell 16 includes a rounded blade supporting portion 32, which is shaped as an annular bowl, for contacting transmission side edges of impeller blades 34.

Radially outside of blade supporting portion 32, a radially extending wall 36, which forms an impeller clutch, radially protrudes outwardly from an outer circumference of rounded blade supporting portion 32 to define an annular wall having a flat annular radially extending turbine facing surface 36a. Accordingly, the impeller clutch and impeller shell 16 are formed as a single piece. Radially inside of blade supporting portion 32, impeller shell 16 includes an annular inner radial extension 39 extending radially inward from blade supporting portion 32. A radially inner end of extension 39 is connected to an impeller hub 41.

A friction material 40 is bonded onto radially extending impeller facing surface 30a of outer radial extension 30 for engaging radially extending wall 36. In other embodiments, instead of or in addition to being bonded to outer radial extension 30, friction material 40 may be bonded to radially extending turbine facing surface 36a of radially extending wall 36. Regardless of whether friction material 40 is bonded to outer radial extension 30 or radially extending wall 36, friction material 40 is provided axially between surfaces 30a, 36a.

Torque converter 10 also includes a stator 42 axially between turbine 20 and impeller 18 to redirect fluid flowing from the turbine blades 26 before the fluid reaches impeller 18 to increase the efficiency of torque converter 10. Stator 42 includes stator casting 44 including a plurality of blades 46 and a stator body 48. Stator 42 also includes a one-way clutch 50 held within stator body 48 by a centering plate 52. An axial thrust washer 54, which is axially between stator 42 and impeller 18, is fixed to stator 42 at an outer circumference of centering plate 52. One-way clutch 50 includes an inner race 56, an outer race 58 and rollers and springs 60 radially between inner race 56 and outer race 58. Stator casting 44 is rotationally fixed to outer race 58, and depending on the operating conditions of torque converter 10, inner race 56 and outer race 58 are rotationally fixed to each other or rotatable relative to each other.

A damper assembly 62 is positioned between front cover 12 and turbine 20 and is configured for transferring torque from turbine 20 to a transmission input shaft. In this embodiment, damper assembly 62 is an in-line series damper riveted directed to the turbine piston 20 by cold formed, round rivets 63. Damper assembly 62 includes two cover plates—a turbine side cover plate 64, which is riveted to turbine 20 by rivets 63, and a front cover side cover plate 66. Cover plates 64, 66 support a set of arc springs 68 axially therebetween. Damper assembly 62 also includes an inner drive flange 70 and an outer drive flange 71 positioned axially between cover plate 64, 66, with inner flange 70 being axially adjacent to cover plate 64, and axially between cover plate 64 and outer drive flange 71, and with outer flange 71 being axially adjacent to cover plate 66, and axially between cover plate 66 and inner drive flange 70. Inner drive flange 70 includes an inner radial hub 72 configured for nonrotatably connecting to a transmission input shaft. Radially outside of springs 68, cover plates 64, 66 are fixed together by a plurality of circumferentially spaced rivets 74. Drive flanges 70, 71 each further include inner circumferentially extending slots 76,78, respectively, for receiving springs 68 and outer circumferentially extending slots 80, 82, respectively, for receiving rivets 74. At an inner diameter thereof, outer flange 71 is provided with an axially extending ring 84 including an outer circumferential surface supporting an inner diameter of cover plate 66.

At an outer circumferential surface of hub 72, a bushing 86 including an L-shaped cross-section is provided for supporting a front cover-side spring 88 contacting a radially extending surface of front cover 12. Spring 88 limits the axial movement of inner flange 70 away from turbine 20 and toward front cover 12. Inner flange 70 is also provided with a turbine-side bias spring 90, which in this embodiment is a diaphragm spring, axially between inner flange 70 and turbine 20. Bias spring 90 includes a plurality of radially inwardly extending tabs 92 at an inner radial end thereof for contacting the outer circumferential surface of hub 35 and axially abutting turbine 20 at axially extending inner circumferential section 33. Bias spring 90 is provided with a plurality of drive flange engaging tabs 94, each provided with a ramp 96 at an axial free end thereof for contacting a respective one of ramps 98 of inner flange 70. Each ramp 98 matches the angle of one of ramps 96 such that relative circumferential motion between inner flange 70 and bias spring 90 causes contact between the ramps 96, 98 to generate a force on turbine 20. When damper assembly 62 travels into the coast direction, ramps 98 contact ramps 96 to produce an axial force.

In accordance with an embodiment of the invention, damper assembly 62 is provided with a rotational hysteresis control package formed by an elastic element, which in this embodiment is in the form of a diaphragm spring 100, and a support, which in this embodiment is formed by portions of rivets 74. A first contact surface 102 of diaphragm spring 100, which in this embodiment is at a radially outer end of a radially extending front cover side surface 104 of diaphragm spring 100, contacts a turbine facing radially extending turbine side surface 106 of outer flange 71. Second contact surface 108 (FIG. 2) of diaphragm spring 100, which is this embodiment is at a radially inner end of the opposite radially extending surface 107, contacts one or more radially and circumferentially extending surfaces 110a, 110b (FIG. 2) of rivets 74. Diaphragm spring 100 is compressed between surface 102 and surface 110a, 110b such that diaphragm spring 100 is axially preloaded between rivets 74 and outer flange 71. Cover plates 64, 66, outer flange 71, diaphragm spring 100, rivets 74 and springs 68 together define a cover plate assembly.

During turbine-piston lockup, where outer radial extension 30 is pressed axially against radially extending wall 36 such that friction material 40 frictionally couples turbine 20 and impeller 18 together, the cover plate assembly (i.e., damper assembly 62 minus the inner flange) moves axially along with turbine piston 20. Cover plates 64, 66, outer flange 71 and diaphragm spring 100 have axial clearance to move relative to inner flange 70. This clearance helps to prevent excessive friction and wear resulting from high load contact. The rotational hysteresis control package is utilized by compressing diaphragm spring 100 located between the support portions of the rivets 74 and outer flange 71. Diaphragm spring 100 creates a controlled load against outer flange 71, which causes outer flange 71 to be pressed against cover plate 64 to control rotational hysteresis (friction) between outer flange 71 and the cover plate assembly of an in-line series damper. The clearance gap between the inner diameter end of diaphragm spring 100 and outer flange 71 is maintained as a result of the shape rivets 74, which is shown in detail in FIG. 2.

Figure 2:
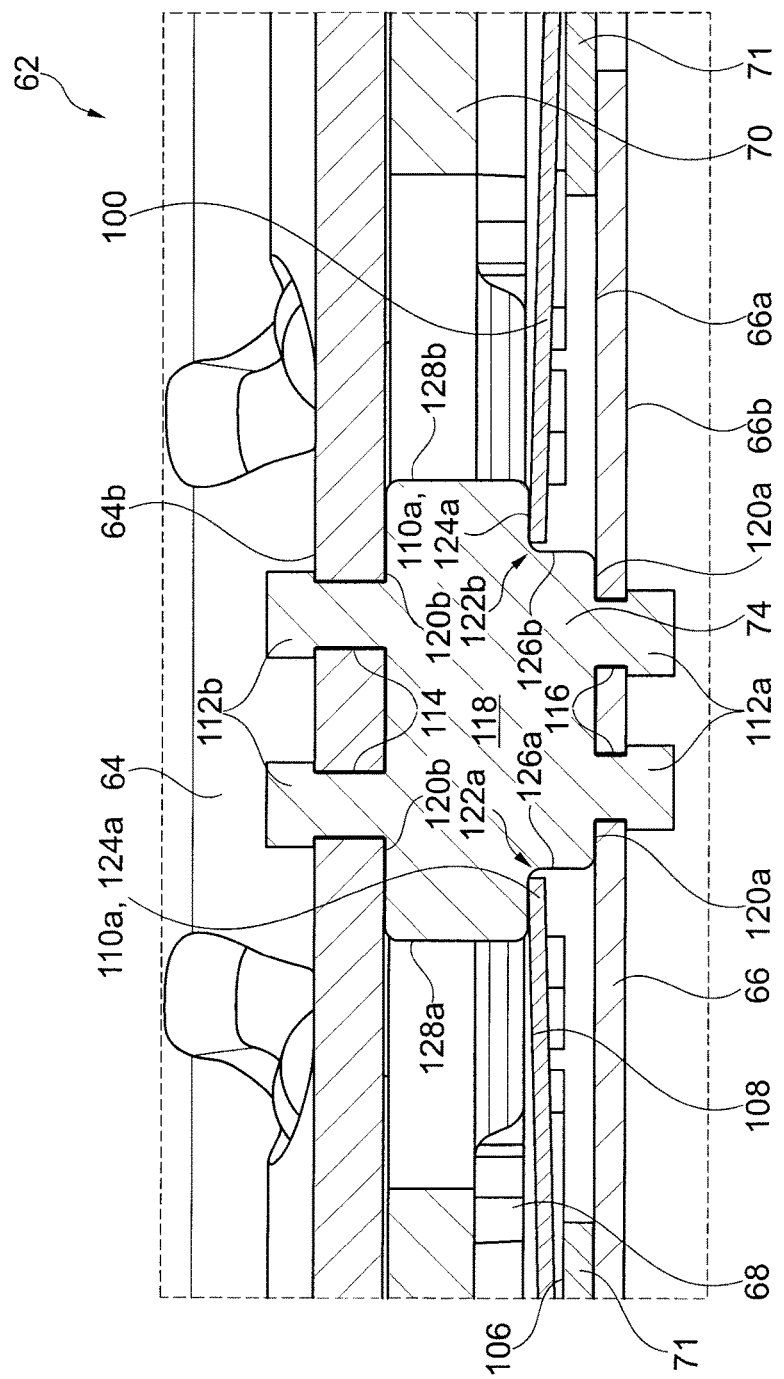
FIG. 2 shows a radial cross-sectional view of the damper assembly of the torque converter in FIGS. 1a and 1b along A-A in FIG. 1b, illustrating a cross-section of one rivet of the damper assembly.

FIG. 2 shows a radial cross-sectional view of damper assembly 62 along A-A in FIG. 1b, illustrating a cross-section of one of rivets 74. Rivet 74 is a sheet metal rivet including two circumferentially spaced connecting sections 112a on a first axial end of rivet 74 passing through holes 114 in cover plate 66 and contacting a front cover side facing radially extending surface 66b of cover plate 66 and two connecting circumferentially spaced sections 112b on second axial end of rivet 74 passing through holes 116 in cover plate 64 and contacting a turbine side facing radially extending surface 64b of cover plate 64. Rivet 74 further includes a body section 118 axially between connecting sections 112a, 112b. Body section 118 includes first shoulders 120a from which connecting sections 112a axially protrude and second shoulders 120b from which connecting sections 112b protrude, with first shoulders 120a contacting turbine facing radially extending turbine side surface 66a of cover plate 66 and second shoulders 120b contacting a front cover facing radially extending surface 64a of cover plate 64. Body section 118, axially between shoulders 120a, 120b, further includes two step sections 122a, 122b forming respective intermediate shoulders 124a, 124b that define respective surfaces 110a, 110b for contacting surface 108 of diaphragm spring 100. Step sections 122a, 122b each includes an axially and radially extending surface 126a, 126b, respectively, that protrudes axially from shoulder 120a, which joins the respective surface 110a, 110b at an elbow. Surfaces 110a, 110b, which also extends radially, extend circumferentially away from the respective surface 124a, 124b to a respective circumferential edge 128a, 128b of body section 118. Circumferential edges 128a, 128b extend circumferentially from the respective surface 110a, 110b to shoulder 120b.

FIG. 3a shows an axial plan view of damper assembly 62 with cover plate 66 removed and FIG. 3b shows an enlarged view of a portion of view in FIG. 3a. FIG. 3c shows an axial plan view of damper assembly 62 with cover plate 66 and outer flange 71 removed and FIG. 3d shows an enlarged view of a portion of view in FIG. 3c. Inner drive flange 70 extends radially outward from hub 72 past an outer circumferential surface 71a of outer drive flange 71 and an outer circumferential surface 100a of diaphragm spring 100. Slots 76, 78 are radially aligned with each other and circumferentially offset from each other such that springs 68 are arranged for being circumferentially contacted by one edge 76a of one slot 76 and one edge 78a of one slot 78 to compress springs 68 during operation. Radially inside of outer circumferential surface 71a and radially outside of slots 78, outer flange 71 includes slots 82 for rivets 74 to pass axially through. Slots 82 are elongated such that the circumferential length of each slot 82 is greater than the circumferential length of the rivet 74 received therein, allowing cover plates 64, 66 and rivets 74 to shift rotationally with respect to outer flange 71 during operation. Diaphragm spring 100, which is formed as a complete ring extending continuously about axis 11, is mounted on rivets 74 such that diaphragm spring 100 is fixed for rotation with cover plates 64, 66 and rivets 74 and for shifting rotationally with respect to outer flange 71 during operation. In this regard, at an inner circumferential surface 100b thereof, diaphragm spring 100 includes radially outwardly extending notches 128, each configured for receiving one of the rivets 74. Notches 128 each includes a first radially extending edge 128a for contacting axially and radially extending surface 124a of the respective rivet 74 and a second radially extending edge 128b for contacting axially and radially extending surface 124b. Notches 128 also each include a circumferentially extending edge 128c extending between edges 128a, 128b.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
an axially movable turbine piston; and
a damper assembly fixed to the turbine piston, the damper assembly including:
a first cover plate,
a second cover plate,
a plurality of fasteners fixing the first cover plate and the second cover plate together such that the second cover plate is spaced from the first cover plate,
a first drive flange axially between the first and second cover plates,
a second drive flange axially between the first and second cover plates, and
an elastic element axially between the first and second cover plates, the first cover plate, the second cover plate, the second drive flange, the fasteners and the elastic element being axially movable with the turbine piston independently of the first drive flange, the elastic element configured to create a controlled rotational hysteresis between the second drive flange and the first and second cover plates during the axial movement of the first cover plate, the second cover plate, the second drive flange, the fasteners and the elastic element.

2. The torque converter as recited in claim 1 wherein the elastic element is diaphragm spring mounted on the fasteners.

3. The torque converter as recited in claim 2 wherein the diaphragm spring, at an inner circumferential surface thereof, includes radially outwardly extending notches each configured for receiving one of the fasteners.

4. The torque converter as recited in claim 1 wherein the first drive flange is an inner drive flange including a drive hub configured for connecting to a transmission input shaft and the second drive flange is an outer drive flange having an inner circumference that is radially outside of an inner circumference of the drive hub.

5. The torque converter as recited in claim 1 wherein each of the fasteners includes a first shoulder for contacting the first cover plate, a second shoulder for contacting the second cover plate and a third shoulder for contacting the elastic element.

6. The torque converter as recited in claim 5 wherein the fasteners are sheet metal rivets.

7. The torque converter as recited in claim 1 wherein the elastic element is axially preloaded between surfaces of the fasteners and a surface of the second drive flange.

8. The torque converter as recited in claim 1 wherein the elastic element is axially between the first drive flange and the second drive flange.

9. The torque converter as recited in claim 1 wherein the elastic element forces the second drive flange away from the first drive flange and toward the second cover plate.

10. The torque converter as recited in claim 1 wherein the elastic element is spaced away from the first drive flange by the fasteners.

11. The torque converter as recited in claim 1 wherein the damper assembly includes springs, the first and second cover plate configured for driving the first and second drive flanges via the springs, the elastic element being radially outside of the springs.

12. The torque converter as recited in claim 1 wherein the fasteners extend through slots formed in the first drive flange and slots formed in the second drive flange.

13. The torque converter as recited in claim 1 wherein the fasteners extend through holes formed in the first cover plate and holes formed in the second cover plate.

14. A method of forming a torque converter comprising:
fixing a first cover plate to a turbine piston; and
providing a first drive flange, a second drive flange and an elastic element axially between the first cover plate and a second cover plate and fixing the first and second cover plates together by fasteners to form a damper assembly such that the first cover plate, the second cover plate, the second drive flange, the fasteners and the elastic element are axially movable with the turbine piston independently of the first drive flange and the elastic element is configured to create a controlled rotational hysteresis between the second drive flange and the first and second cover plates during the axial movement of the first cover plate, the second cover plate, the second drive flange, the fasteners and the elastic element.

15. The method as recited in claim 14 wherein the fixing the first and second cover plates together includes mounting the elastic element on the fasteners.

16. The method as recited in claim 15 further comprising forming the elastic element as a diaphragm spring including, at an inner circumferential surface thereof, radially outwardly extending notches each configured for receiving one of the fasteners.

17. The method as recited in claim 14 wherein the first drive flange is an inner drive flange including a drive hub configured for connecting to a transmission input shaft and the second drive flange is an outer drive flange having an inner circumference that is radially outside of an inner circumference of the drive hub.

18. The method as recited in claim 14 wherein the fixing the first and second cover plates together includes contacting the first cover plate with first shoulders of each of the fasteners, contacting the second cover plate with second shoulders of each of the fasteners and contacting the elastic element with third shoulders of each of the fasteners.

19. The method as recited in claim 18 wherein the fasteners are sheet metal rivets.

20. The method as recited in claim 14 wherein the fixing the first and second cover plates together includes axially preloading the elastic element between surfaces of the fasteners and a surface of the second drive flange.

\* \* \* \* \*